(12) United States Patent
Martin et al.

(10) Patent No.: US 8,480,938 B2
(45) Date of Patent: Jul. 9, 2013

(54) METHOD FOR PRODUCING A STORAGE ELEMENT IN TEXTILE AND PLASTIC MATERIAL

(75) Inventors: Grégory Martin, Beauvais (FR); Jean-Pierre Praud, Auvers sur Oise (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 13/173,900

(22) Filed: Jun. 30, 2011

(65) Prior Publication Data

US 2012/0169082 A1    Jul. 5, 2012

(30) Foreign Application Priority Data

Jun. 30, 2010   (FR) ...................................... 10 02746

(51) Int. Cl.
    *B29C 45/14* (2006.01)
(52) U.S. Cl.
    USPC ............................ 264/252; 264/257; 264/259
(58) Field of Classification Search
    USPC ................. 264/247, 248, 252, 253, 257, 241, 264/259
    See application file for complete search history.

(56) References Cited

U.S. PATENT DOCUMENTS

| | | | | |
|---|---|---|---|---|
| 3,511,902 | A | * | 5/1970 | Santangelo .................. 264/251 |
| 3,755,031 | A | * | 8/1973 | Hoffman et al. .............. 264/250 |
| 5,964,491 | A | * | 10/1999 | Marsh et al. ............... 296/37.16 |
| 2004/0112895 | A1 | | 6/2004 | Bartasevich, Jr. et al. |
| 2007/0296234 | A1 | | 12/2007 | Sturt et al. |

FOREIGN PATENT DOCUMENTS

| | | |
|---|---|---|
| DE | 102006048197 A1 | 4/2008 |
| EP | 1433585 A2 | 6/2004 |

OTHER PUBLICATIONS

French Search Report for FR 10 02746, May 13, 2011, 2 pages.
Written Opinion for FR 10 02746, date unknown, 4 pages.

* cited by examiner

*Primary Examiner* — Jill Heitbrink
(74) *Attorney, Agent, or Firm* — Reising Ethington P.C.

(57) ABSTRACT

A method for producing a storage element having a plurality of faces in which a portion of the faces is made in textile material. The method includes the steps of: producing a pattern in textile material, the pattern comprising several panels, placing the pattern in an unfolded condition in an injection mold, injecting a plastic material into the injection mold around the panels so as to overmold at least one portion of each of the panels so as to obtain a pattern comprising the faces in textile and plastic materials of the storage element in the unfolded condition, folding the pattern and attaching the faces to each other.

6 Claims, 3 Drawing Sheets

METHOD FOR PRODUCING A STORAGE ELEMENT IN TEXTILE AND PLASTIC MATERIAL

BACKGROUND AND SUMMARY OF THE INVENTION

The present invention relates to a method for producing a storage element.

The invention also relates to a storage element obtained by such a producing method.

The invention more particularly relates to a storage element of the central console type of a motor vehicle. Such a console is generally positioned between the front seats of the motor vehicle and allows access to a small storage space. Providing removable consoles is known, which may be attached in the motor vehicle and detached in order to be transported by a passenger of the vehicle. Thus, when the passenger leaves the vehicle, he/she does not need to empty the storage space of the console and transfer its contents into a bag for example.

Such a removable console should preferably have acceptable aesthetics close to a handbag or a conventional piece of luggage so as to be transported without any bother by the passenger outside the vehicle. Thus, it is sought to provide the console with a structure and aspect as close as possible to a leather article, for example, or a bag in textile material.

However, such a console also has to be able to be easily integrated into the motor vehicle and have all the features of a conventional central console of a motor vehicle, such as technical interfaces of the type of means for attaching the console to its environment. These interfaces are generally made in plastic material in an injection mold.

Such a storage element is therefore difficult to produce because of these different requirements, requiring that the storage element have a "textile" aspect while comprising elements in plastic material for its integration into the vehicle.

One of the objects of the invention is to facilitate the production of such a storage element by proposing a method for producing the elements with which both a functional element may be obtained and having a satisfactory aesthetical aspect.

For this purpose, the invention relates to a method for producing a storage element comprising a plurality of panels, at least one portion of said panels being made in a textile material, said method comprising the following steps: producing a pattern in textile material, said pattern comprising several panels, each panel being connected to another panel by a folding line; placing the pattern in the unfolded condition into an injection mold; injecting a plastic material into the injection mold around the panels so as to overmold at least one portion of each of said panels and the folding lines so as to obtain a pattern comprising the faces in textile and plastic materials of the storage element in the unfolded condition; and folding said pattern and attaching said faces to each other so as to form the storage element.

With such a method, it is possible to easily obtain with a few operations a storage element, the visible faces of which are in a textile material and are substantially flexible, giving the element a satisfactory aspect close to that of a conventional piece of luggage, and the edges of which are in plastic materials in order to provide the element with adequate rigidity for its use in a motor vehicle and allowing the integration of technical interfaces.

According to other features of the method:

the method comprises a step for producing a bottom exclusively in plastic material during the plastic material injection step, said bottom being connected to one of the faces in textile and plastic material through a folding line in plastic material;

assembling members are formed during the injection of the additional panel, said assembling members allow the bottom to be attached to at least two faces in textile and plastic material;

members for attaching the storage element to another element are formed in a single piece with the bottom during the injection of said bottom;

the plastic material injection is laid out so that the plastic material overmolds a portion of the edges of the panels in textile material, at least one of the edges of some of said panels not being overmolded with plastic material; and a portion of a zipper is attached on the edge intended to be non-overmolded with plastic material prior to the injection of the plastic material.

The invention also relates to a storage element that may be obtained according to a method as described above, said element comprising a plurality of faces defining between them a storage space, in which at least some of said faces are in textile material, at least one portion of the edges of said faces are in textile material, at least one portion of the edges of said faces being overmolded with a plastic material, the center of some of said faces not being overmolded with a plastic material.

According to other features of the storage element:

the storage element comprises two first lateral faces, three edges of which are overmolded with a plastic material, said faces being connected to each other through a third lateral face in a textile material entirely overmolded with a plastic material, a lid being connected to said third face through an edge in textile material overmolded with a plastic material;

the storage element further comprises a bottom made in a plastic material, said bottom connecting both first lateral faces and the third lateral face and extending facing the lid; and the storage element as described above forms a central console of a motor vehicle.

BRIEF DESCRIPTION OF THE DRAWINGS

Other aspects and advantages of the invention will become apparent upon reading the following description, given as an example and made with reference to the appended drawings, wherein.

DETAILED DESCRIPTION OF THE ILLUSTRATED EMBODIMENT

Figure 1:
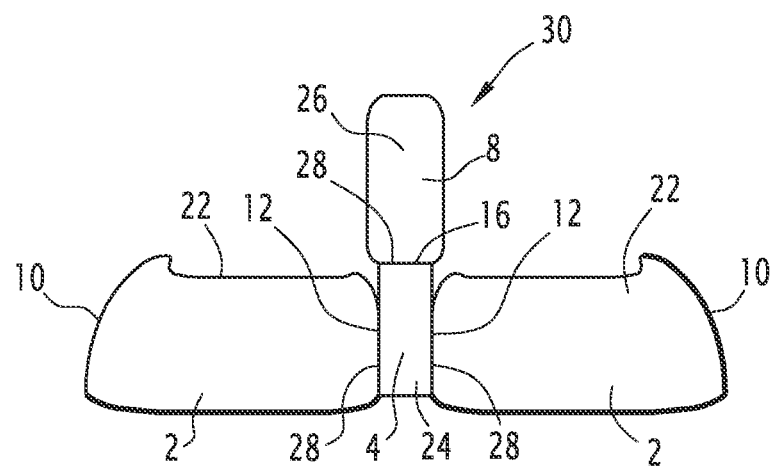
FIG. 1 is a schematic illustration of a pattern in a textile material made according to a first step of the producing method of the invention.

In the description, the term of "longitudinal" is defined along a direction substantially corresponding to the length of a storage element, and the term of "transversal" is defined along a direction substantially corresponding to the height of the storage element.

The producing method described below gives the possibility of obtaining a storage element 1 of the motor vehicle central console type, this console has to be removable in order to be transported outside the vehicle. For this purpose, it is desired that the storage element 1 have a satisfactory aesthetic aspect, while comprising areas in plastic material, allowing integration of technical interfaces, such as members for attaching the storage element 1 to its surroundings in a motor vehicle.

For this purpose, a storage element 1 is made, having a substantially parallelepipedal shape. The storage element comprises two first lateral faces 2, a third lateral face 4, a bottom 6 and a lid 8.

Figure 6:
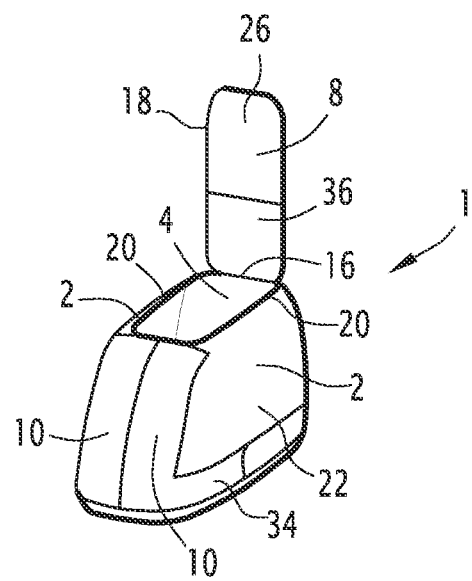

Both of the first lateral faces 2 are positioned facing each other. One of the transversal edges of each of these first lateral faces 2 forms a setback 10 directed towards the other first lateral face 2 and is attached to the corresponding transversal edge of the other lateral face 2 as illustrated in FIG. 6. The transversal edge 12 opposite to the setback 10 is connected to the third lateral face 4, which therefore connects both first lateral faces 2.

The bottom 6 extends under the lateral faces 2 and 4 and is attached to the lower edges 14 of the latter. The lid 8 extends facing the bottom 6 and closes the assembly. The lid 8 is thereby attached to the upper edge 16 of the third lateral face 4 and is removably attached for example by means of a zipper 18, to the upper edges 20 of both first lateral faces 2 in order to allow the opening and the closing of the storage element 1.

The first and third lateral faces 2 and 4, as well as the lid 8 are made from panels in textile material 22, 24, 26 attached to each other through folding lines 28. Thus, as illustrated in FIG. 1, the panels 22 forming the first lateral faces 2 are bound to the panel 24 forming the third lateral face 4 by folding lines 28, extending along the transversal edges 12. The panel 26 forming the lid 8 is bound to the panel 24 forming the third lateral face 4 by a folding line 28, extending along the upper edge 16 of the third lateral face 4.

The panels 22, 24 and 26 therefore form a pattern 30 in textile material made in one piece, as illustrated in FIG. 1. In order to produce the storage element 1 described above, the pattern 30 is placed, in the unfolding condition illustrated in FIG. 1, in a plastic material injection mold. The shape of the mold is laid out so that the injected plastic material overmolds a portion of the pattern 30 according to the shape illustrated in FIG. 2 and further forms the bottom 6, which is exclusively made in plastic material. This bottom 6 for example has the shape of a pan, as visible in FIG. 4.

Figure 2:
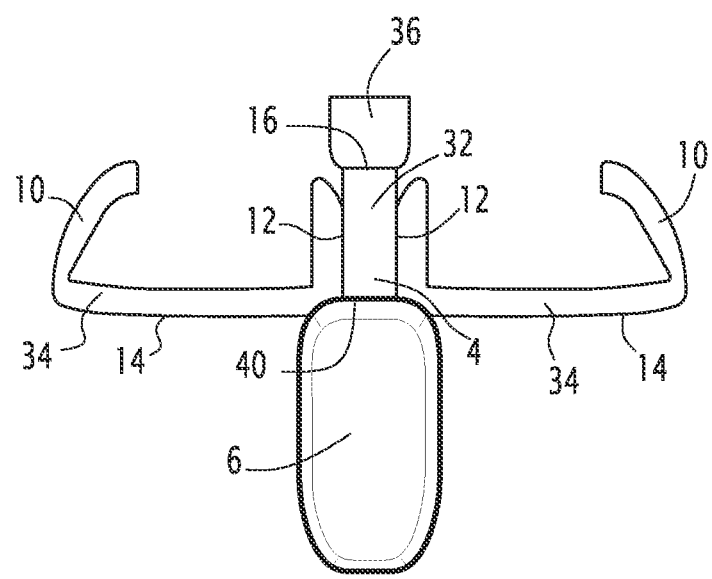
FIG. 2 is a schematic perspective illustration of the shape of the plastic material obtained after injection of said material.

Thus, as illustrated in FIG. 2, the mold is laid out so that the plastic material overmolds the entirety of the textile panel 24 forming the third lateral panel 4 while forming a panel in plastic material 32 above the textile panel 24. The plastic material also overmolds both transversal edges 10 and 12 and the lower edge 14 of the panels 22 forming the first lateral faces 2, while forming a plastic material strip 34 overmolding said edges. Finally, the plastic material overmolds a portion of the textile panel 26 of the lid 6 in the vicinity of the upper edge 16, by forming a plastic material tab 36 overmolding said panel portion 26. It will be noted that the panel 32, the strips 34 and the tab 36, also overmold the folding lines 28 connecting the textile material panels 22, 24 and 26.

Figure 3:
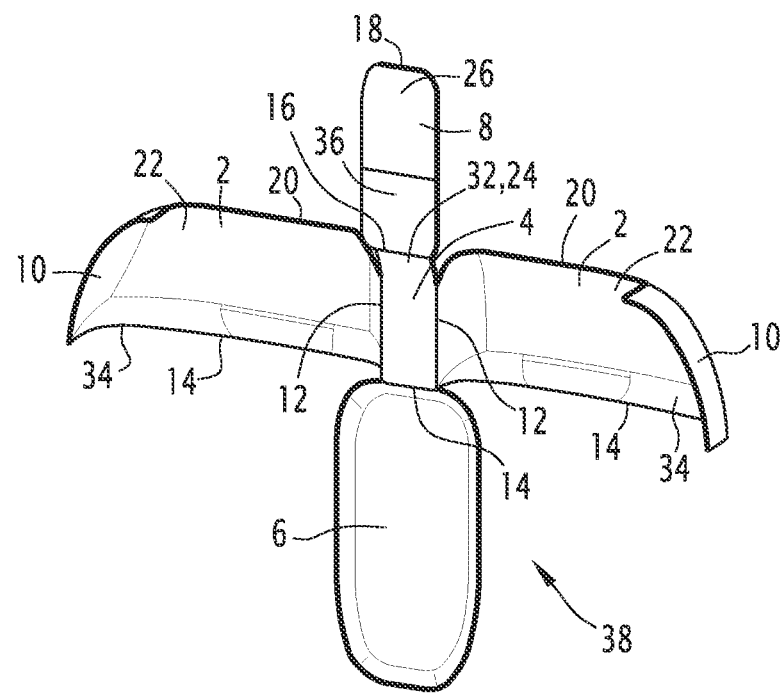
FIG. 3 is a schematic perspective illustration of the pattern obtained after injection of the plastic material into the injection mold according to a step of the producing method of the invention.

Thus, a pattern 38 in the unfolding condition is obtained upon exiting the mold, as illustrated in FIG. 3. The pattern 38 thus comprises both first lateral faces 2, each formed with a central portion and an upper edge 20 in textile material from the panels 22 and transversal edges 10 and 12 and a lower edge 14 in plastic material from the strip 34, the third lateral face 4 formed in textile material overmolded by plastic material, the bottom 6 exclusively formed in plastic material and the lid 8, comprising a free end portion in textile material formed from the panel 26 and an end portion in plastic material formed from the tab 36 joined to the third lateral face 4. The bottom 6 is connected to the third lateral face 4 through a folding line 40 made in plastic material extending along the lower edge 14 of the third lateral face 4. The other folding lines 28 are made in textile material overmolded by plastic material, as described above.

Figure 4:
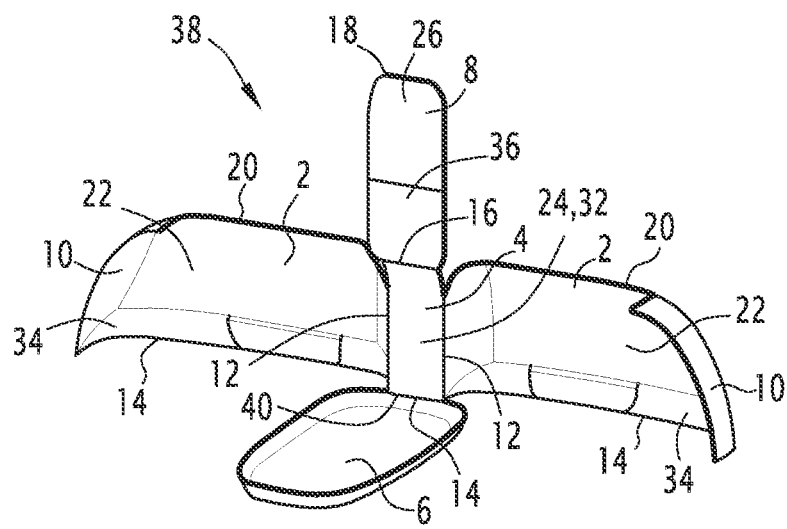
FIGS. 4 to 6 illustrate the different steps for folding the pattern of FIG. 3 in order to obtain a storage element according to the invention.
Figure 5:
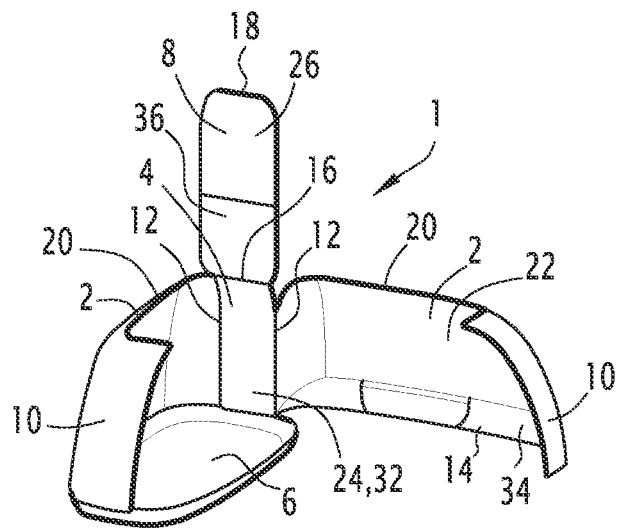

The pattern 38 is then folded as illustrated in FIGS. 4 to 6 in order to form the storage element 1. The bottom 6 is first folded towards the lateral faces 2 and 4 around the folding line 40, as illustrated in FIG. 4, and then both first lateral faces are folded towards each other around the folding lines 28, as illustrated in FIGS. 5 and 6. The bottom 6 and the first lateral faces 2 are then attached to each other through assembling members such as clips (not shown). As the bottom 6 and the first lateral faces 2 are joined to each other at the lower 14 and transversal 10 edges made in plastic material, the assembling members are made in one piece with the bottom 6 and the strips 34 during the injection of the plastic material into the injection mold, the shape of which is adequately adapted.

A storage element 1 is thereby obtained, which may be opened and closed by the lid 8. This closure is, for example, accomplished with a zipper 18. The elements of this zipper 18 are for example sewn to the upper edges 20 of the first lateral faces 2 and to the corresponding edges of the lid 8 before placing the pattern 30 in the injection mold. After injection of the plastic material and, having achieved folding of the pattern 38, the zipper elements are attached to each other, for example by means of crimped clamps (not shown).

A storage element 1 is thereby obtained, which is particularly simple to produce, the producing method described above requiring few tools and few steps. The storage element 1 is particularly suitable for forming a removable central console of a motor vehicle. For this purpose, members for attachment to the motor vehicle may be made in a single piece with the bottom 6 upon injecting the plastic material. The areas in apparent textile material, i.e. the central area of both first lateral faces 2 and the end portion of the lid 8, give the storage element a satisfactory aspect for using the storage element as a conventional piece of luggage.

With the areas in plastic material, technical interfaces may easily be integrated such as members for attachment to the motor vehicle, during the injection of the plastic material, by adequately adapting the shape of the mold. These attachment members for example appear as members for locking the bottom on an element of the motor vehicle. In this case, the locking members are for example molded in a single piece with the bottom.

Further, the plastic material gives the possibility of imparting sufficient rigidity to the storage element for its use as a central console. The storage element further has a significant lifetime, the folding lines being overmolded by the plastic material, which limits risks of wear and tear.

The storage element 1 described above, has a particular shape. Of course, other shapes may be contemplated simply by modifying the shape of the pattern in textile material and by adequately adapting the injection mold.

The invention claimed is:

1. A method for producing a storage element comprising a plurality of faces at least one portion of said faces being made in textile material, said method comprising the following steps:
   producing a pattern in textile material, said pattern comprising several panels, each panel being connected to another panel through a folding line, placing the pattern in the unfolded condition in an injection mold, injecting a plastic material into the injection mold around the panels so as to overmold at least one portion of each of said panels and all the folding lines, so as to obtain a pattern comprising the faces in textile and plastic materials of the storage element in the unfolded condition, the injection being arranged such that a central portion of at least some of said panels is not overmolded by the plastic material, folding said pattern and attaching said faces to each other so as to form the storage element.

2. The method for producing a storage element according to claim 1, characterized in that it comprises a step of producing a bottom exclusively in plastic material during the step of injecting the plastic material, said bottom being connected to one of the faces in textile and plastic material through a folding line in the plastic material.

3. The method for producing a storage element according to claim 2, characterized in that assembling members are formed during the injection of the bottom panel, said assembling members allowing the bottom to be attached to at least two faces in textile and plastic material.

4. The method for producing a storage element according to claim 2, characterized in that members for attachment of the storage element to another element are formed in a single piece with the bottom during the injection of said bottom.

5. The method for producing a storage element according to claim 1, characterized in that the injection mold is laid out so that the plastic material overmolds a portion of the edges of the panels in textile material, at least one of the edges of some of said panels not being overmolded with plastic material.

6. The method for producing a storage element according to claim 5, characterized in that a portion of a zipper is attached onto the edge intended not to be overmolded by the plastic material before injection of the plastic material.

\* \* \* \* \*